Jan. 1, 1935.  W. V. LANE  1,986,732

VEHICLE SIGNAL

Filed Oct. 18, 1932   2 Sheets-Sheet 1

INVENTOR.
Weldon V. Lane
BY
Lancaster, Allwine & Rommel
ATTORNEYS.

Jan. 1, 1935.  W. V. LANE  1,986,732
VEHICLE SIGNAL
Filed Oct. 18, 1932  2 Sheets-Sheet 2

INVENTOR.
Weldon V. Lane
BY
Lancaster, Allwine, Rommel
ATTORNEYS.

Patented Jan. 1, 1935

1,986,732

UNITED STATES PATENT OFFICE 1,986,732

VEHICLE SIGNAL

Weldon V. Lane, Asbury Park, N. J.

Application October 18, 1932, Serial No. 638,367

3 Claims. (Cl. 177—329)

The present invention relates to vehicle signals and the primary object of the invention is to provide an improved construction for signals of this character adapted to display various warning signals both forwardly and rearwardly of the vehicle upon which the signal is mounted.

A further object of the invention is to provide a vehicle signal wherein a series of signal compartments are arranged radially about a central compartment having an opening to one side of the signal casing and permitting ready and easy making of electrical connections to the separate signal lamps of the compartments.

A further object resides in the novel construction of the signal permitting ready and easy assembling and dismembering of the signal, as well as allowing for easy renewing of parts.

A further object resides in the novel manner of dividing the signal casing into a series of independent signal compartments and a wiring or terminal compartment by a separator providing a combined lamp and signal panel support, and the manner in which the signal panels are firmly held against displacement at each side of the radially arranged signal compartments. A still further object of the invention is to provide a vehicle signal of this character which will be extremely neat in appearance, strong and durable, and a signal which may be readily mounted upon various portions of a motor vehicle for displaying signals both forwardly and rearwardly thereof.

Other objects and advantages of the invention will be apparent during the course of the following detailed description, taken in connection with the accompanying drawings forming a part of this specification and in which drawings:—

Figure 1:
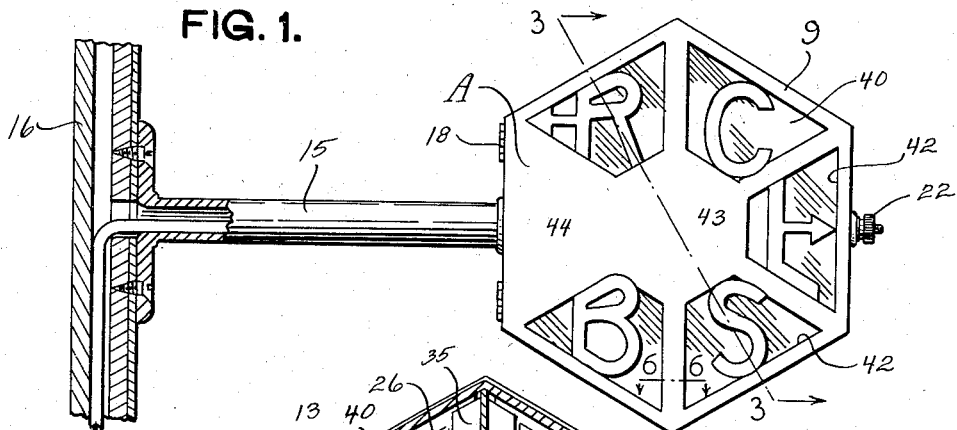
Figure 1 is a front plan view of the improved vehicle signal and showing the manner of mounting the signal.

Referring to the drawings in detail and wherein similar reference characters designate corresponding parts throughout the several views, the improved signal comprises a casing A of hexagonal shape in plan and embodying a main body portion 8 having its open sides closed by front and rear covers 9 and 10 respectively. Removably fitting in the casing A is a combined separator and support B for dividing the signal casing into a series of signal compartments and a wiring compartment extending to one side of the signal casing.

The main body portion 8 is preferably cast or molded from metal or other suitable material and is of hexagonal shape providing six angularly arranged walls of equal area. This formation of the body portion 8 provides inner and outer side walls 11 and 12 respectively, from the upper ends of which extend the upwardly converging top walls 13, and from the lower ends of which extend the downwardly converging bottom walls 14. The body portion 8 is open at both its front and rear sides and will permit of the separator B being inserted thereinto from either open side of the body portion.

Cast integral with the body portion 8 and projecting from the inner side wall 11 is a tubular supporting or bracket arm 15 for mounting of the signal casing such as upon a portion of a vehicle as indicated at 16. This tubular bracket arm 15 also serves to conceal the electric wires leading into the signal casing A.

The hinged doors or covers 9 and 10 are also cast or molded from metal or other suitable material and these covers 9 and 10 respectively provide front and rear casing display walls for displaying like signals both forwardly and rearwardly of the casing. The covers 9 and 10 are each of hexagonal shape in plan and provided at their marginal edges with a flange 17 which engages with a snug fit over the outside of the casing body portion 8. These covers are each hingedly connected at the flange along their inner straight edges by hinges 18 to the inner side wall 11 of the casing body portion so that each cover may swing independently of the companion cover.

Figure 2:
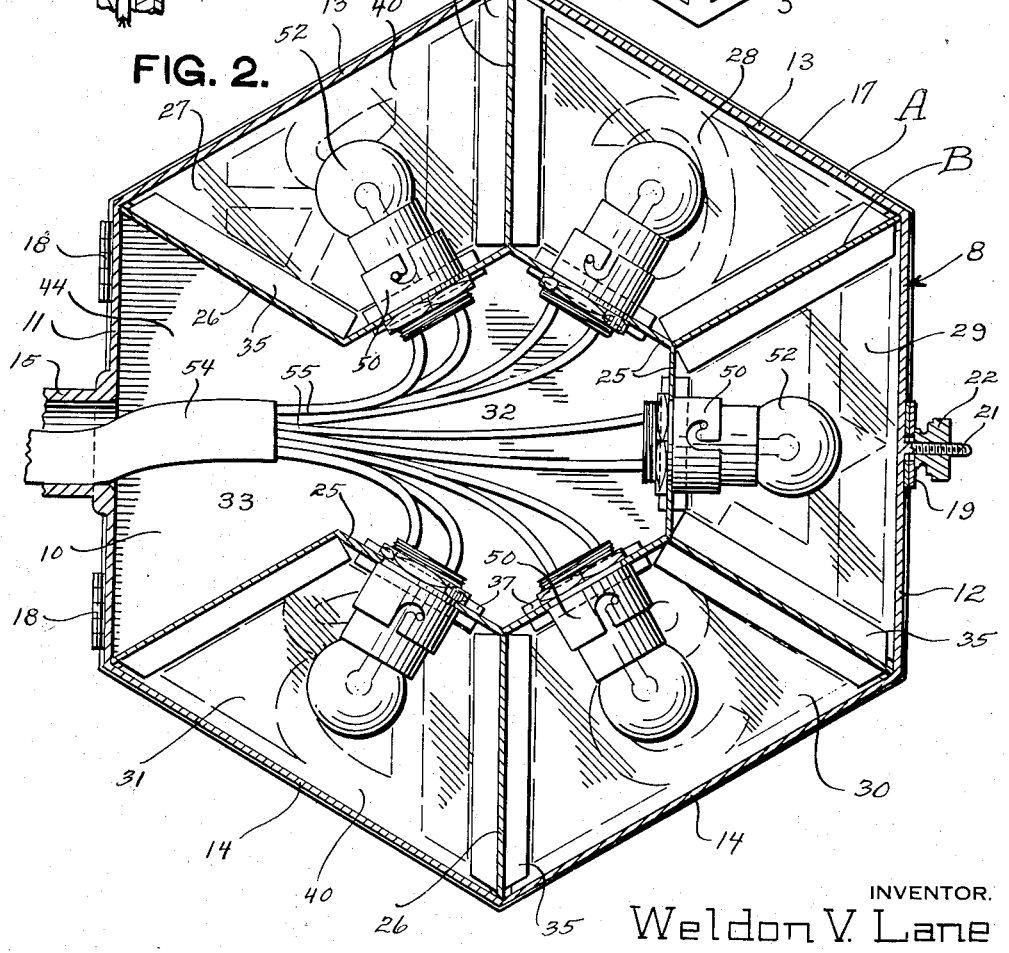
Figure 2 is an enlarged sectional view.
Figure 5:
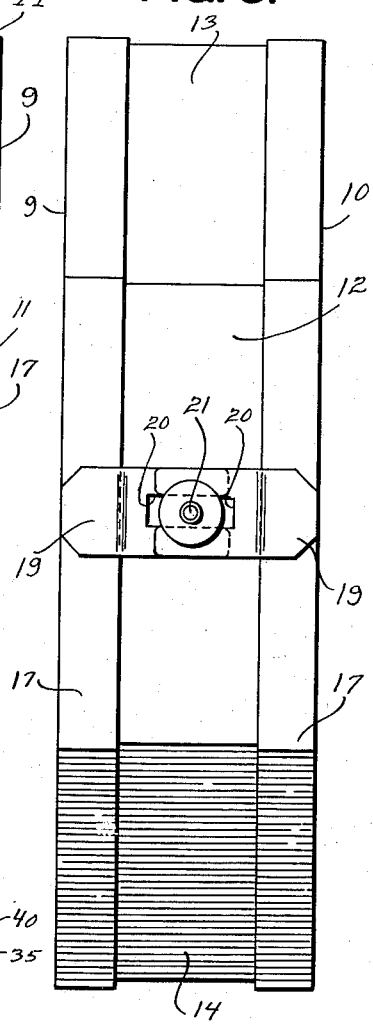
Figure 5 is a view looking at the outer edge of the signal and showing the arrangement for retaining the hinged doors closed by a single fastening means.
Figure 7:
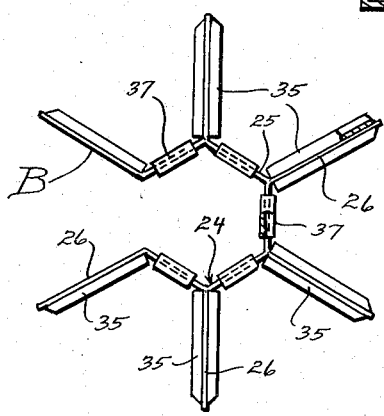
Figure 7 is a plan view of the separator for removable positioning in the signal casing.

Carried by the outer or face edge of each cover is a flat fastening strip 19 slotted as at 20 to receive a threaded fastening stud 21 rigidly secured to the center portion of the outer casing wall 12. When the covers are both closed over the open sides of the casing body portion, the bifurcated ends of the strips 19 overlap one another as clearly shown in Figure 5 with the studs 21 projecting through the aligning slots 20. A knurled retaining nut 22 threaded on the stud 21 acts to bind the ends of the strips 19 upon one another and against the casing wall 12 as in Figure 2 whereby both of the covers 9 and 10 are held closed by the single retaining nut 22.

Referring now to the specific construction and formation of the combined separator, lamp and signal panel support B for dividing the casing A into a series of independent signal compartments and a wiring or terminal compartment, the same is preferably made from a suitable gauge of sheet metal and of a size to slidably fit in the casing body portion 8 and be securely held by the covers 9 and 10. The separator B is formed with an open hexagonal-like central portion 24 being open along one side and providing a series of five angularly related lamp supporting plates 25 arranged parallel to the casing walls 12, 13 and 14. Extending radially from the hollow central portion 24 at the ends of the plates 25 is a series of six partitioning plates 26, the outer ends of which slidably fit in the angles of the hexagonal casing body portion 8. These partitioning plates 26 may be soldered or otherwise secured at their inner edges to the central portion 24, and if so desired, the partitioning plates which extend from the open side of the central portion to the angles at the ends of the inner casing wall 11 may be formed integral with the central portion as shown. The separator B when positioned in the casing A provides a series of separate signal compartments 27, 28, 29, 30 and 31 arranged about a central or axial compartment 32, and a terminal compartment 33 extending from the open side of the central portion 24 to the inner side wall 11 of the casing. As will be observed, these signal compartments are of wedge-shape and converge toward the axis of the signal casing.

Figure 3:
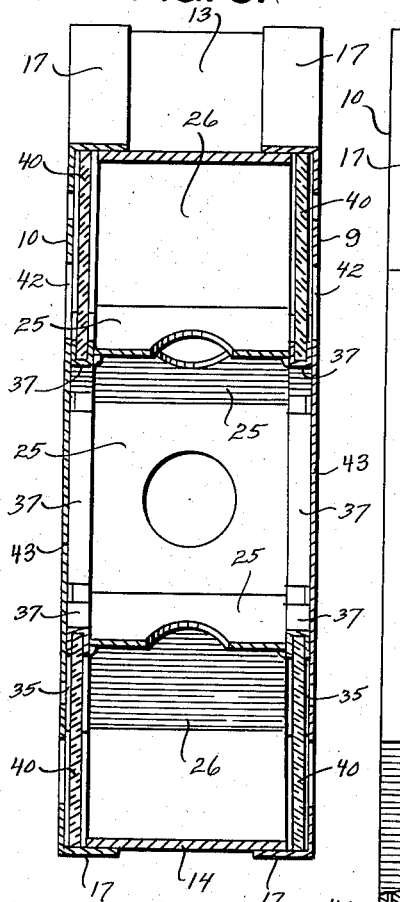
Figure 3 is an enlarged transverse section, on the line 3—3 of Figure 1.
Figure 4:
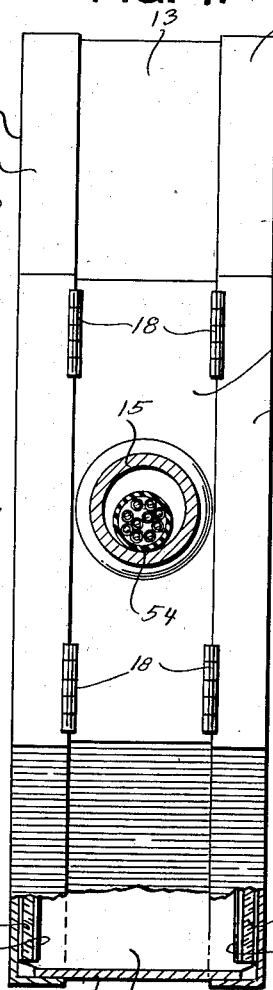
Figure 4 is a view looking at the inner edge of the signal and showing a fragmentary portion broken away.
Figure 6:
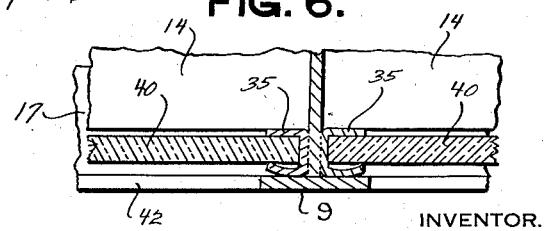
Figure 6 is an enlarged fragmentary section on the line 6—6 of Figure 1.

The partitioning plates 26 are slightly wider than the casing body portion 8 as clearly shown in Figures 4 and 6 and have secured thereto along opposite sides of their front and rear edges, and beyond the edges of the body portion 8, sets of oppositely arranged channel-shaped retaining clips 35 which extend from the supporting plates 25 to points closely adjacent the outer ends of the partitioning plates. As will be observed from Figure 6, these channel-shaped clips 35 are secured by their web or base portions to the partitioning plates as by soldering, welding or the like. These channels 35 are of a yieldable or spring nature for a purpose to be subsequently explained. The supporting plates 25 are of a width equal to that of the body portion 8 as shown in Figure 3 and have secured thereto along their front and rear end edges, stop channels 37 which align with their retaining channels 35. These stop channels 37 are secured by one flange to the supporting plates 25 so that their web portions project into the center compartment 32.

Each set of channels 35 and 37, at each side of the separator B, is adapted to slidably receive a signal panel 40 preferably formed of glass and appropriately colored, with the companion pairs of signal panels colored alike. These signal panels 40 are of substantially wedge-shape and have their converging edges engaging with a wedging fit in the converging retaining channel-shaped clips 35, and with the shorter inner edges of the panels engaging in the stop channels 37. When the signal panels are thus in place, and the separator B in position in the casing A, the outer long edges of the panels extend flush with the outer surfaces of the casing walls 12, 13 and 14 as shown in Figure 3 so that the separator is held against displacement in the casing body portion by the outer edges of the signal panels. With this arrangement, when the covers 9 and 10 are closed, the cover flanges 17 so engage the outer edges of the signal panels as to prevent possible displacement of the panels.

By so having the retaining channels of the spring or yieldable nature, the channels may be caused to firmly grip the tapered sides of the signal panels as shown in Figure 6. This not only prevents rattling of the panels but also prevents the lower signal panels for the signal compartments 30 and 31 from falling out when the covers 9 and 10 are opened.

Referring now to the construction of the covers 9 and 10 permitting display of like signals both forwardly and rearwardly of the signal, each cover is provided in its display wall with a series of sight openings or windows 42 which conform to the shape of the signal compartments with which the sight openings align. Each cover is formed with a blank center portion 43 for overlying the central compartment 32, and a blank portion 44 extending from the portion 43 to the hinged edge of the cover for overlying the terminal compartment 33. Thus the cover portions 43 and 44 serve to conceal all wiring in the signal casing. While any form of lettering or other signalling indicia may be provided, it is preferred that letters be formed in the sight openings 42 from the material of which the covers are made. In the example illustrated, the letter R together with an arrow is formed in the sight openings for the signal compartment 27 to designate a right turn; the letter C formed in the sight openings for the signal compartment 28 designating "caution"; the letter L together with an arrow formed in the sight openings for the compartment 29 designating a left turn; the letter S formed in the sight openings for the compartment 30 designating "stop", and the letter B formed in the sight openings for the compartment 31 designating "back".

Secured in each of the supporting plates 25 of the separator B is an electric socket 50 for mounting of an electric lamp 52 in each of the signal compartments 27 to 31. An electric cable 54 extends through the tubular supporting arm 15 into the terminal compartment 33 where branch wires 55 are connected to the various signal lamps 52 through the sockets 50. The lamps 52 may be controlled by any preferred switching arrangement for selectively controlling the lamps.

Thus it will be seen that a vehicle signal has been provided which will be extremely neat in appearance, strong in its mechanical make-up, and embodying an arrangement whereby the individual signals are compactly grouped for effectively displaying a number of warning signals without objectionably increasing the size of the signal. It will also be apparent that a novel and simple arrangement is provided for securely retaining the separator in the casing and the signal panels firmly against rattling and displacement at all times.

Changes in detail may be made to the form of invention herein shown and described, without departing from the spirit of the invention or the scope of the following claims.

I claim:

1. A vehicle signal comprising a casing including a main body portion open at its front and rear sides; a pair of covers for closing the open sides and each having a marginal flange for overlying the main body portion, a separator fitting into the main body portion embodying radially extending partition plates providing a series of annularly grouped signal compartments, radially extending retaining channels carried by the separator beyond the plane of the front and rear edges of the main body portion, and signal panels slidably fitting between companion pairs of the retaining channels to be engaged at their outer edges by the flanges of said covers when closed over the main body portion.

2. A vehicle signal comprising a casing including a polygonal-shaped main body portion open at its front and rear sides and display walls closing the open sides of the main body portion, a separator slidably fitting in the main body portion embodying a series of radially arranged partitioning plates fitting at their outer ends in the angles of the main body portion and joined at their inner ends by a central portion, retaining channels secured along the front and rear edge portions of the partitioning plates, signal panels slidably fitting in the retaining channels, and signal lamps supported by said central portion between adjacent pairs of partitioning plates.

3. A vehicle signal comprising a casing including a hexagonal-shaped main body portion open at its front and rear sides, a pair of covers for closing the open sides of the main body portion and providing display walls having sight openings, a separator in the casing embodying a central portion open at one side and radially arranged partitioning plates fitting at their outer ends in the angles of the main body portion, said central portion and partitioning plates providing signal compartments for the sight openings and a terminal compartment communicating with the open side of the central portion and extending to one side wall of the main body portion, said side wall having an opening into the terminal compartment, a signal panel between the partitioning plates for each signal compartment at the front and rear edges of the partitioning plates, retaining means for said signal panels, signal lamps supported by said central portion for each of the signal compartments, and conductors for the signal lamps extended thru the opening in said side wall and thru the terminal compartment into the central portion.

WELDON V. LANE.